July 9, 1929.  G. E. BALDWIN  1,720,256

AUTOMATIC TRAIN PIPE COUPLING HEAD

Original Filed April 4, 1921

INVENTOR
George E. Baldwin
BY
Watson, Coit, Morse & Grindle
ATTORNEYS

Patented July 9, 1929.

1,720,256

UNITED STATES PATENT OFFICE.

GEORGE E. BALDWIN, OF PLAINFIELD, NEW JERSEY, ASSIGNOR TO JOSEPH ROBINSON, OF WESTMOUNT, PROVINCE OF QUEBEC, CANADA.

AUTOMATIC TRAIN-PIPE COUPLING HEAD.

Application filed April 4, 1921, Serial No. 458,198. Renewed October 26, 1928.

My invention relates to automatic train pipe couplings for railway cars and has among its objects to provide an improved coupling head provided with a novel means for attaching the train pipe hose of the car to the head and for removing and replacing a gasket from between the faces of mated coupling heads while car remains coupled.

With these and other objects in view my invention resides in the combinations, arrangements and constructions hereinafter described, pointed out in the appended claims and illustrated in the accompanying drawings, in which:
Figure 1 is a sectional side elevation of my improvement showing in section my improved means for attaching the train pipe hose to the automatic coupling, or head. In this view a part of the coupling head is broken away to more clearly illustrate my improvement.

Figure 1:
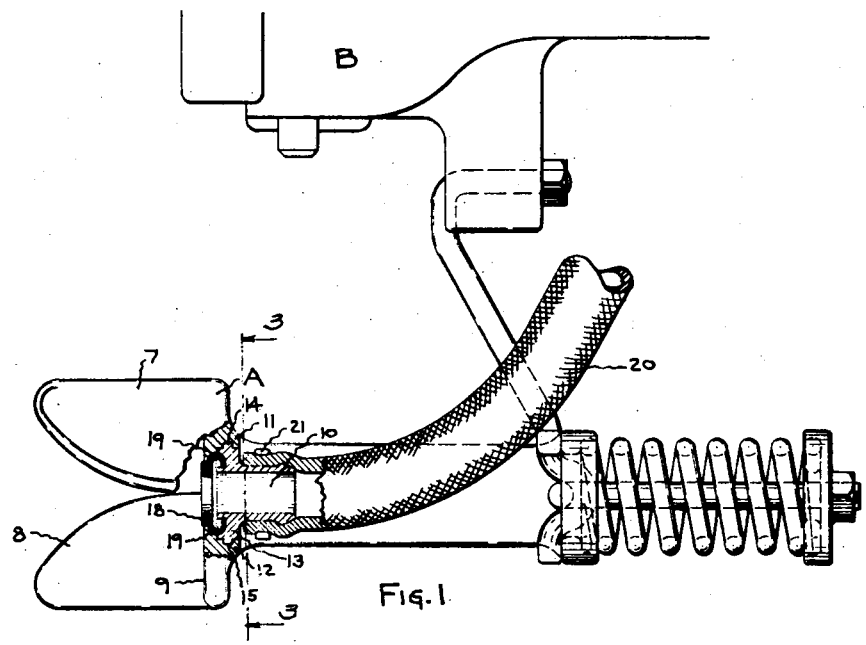
Figure 2:
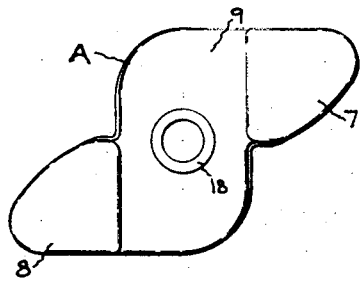
Figure 2 is a front elevation of a coupling head provided with my improvement. In this view the bracket or support for the head is not shown.
Figure 3:
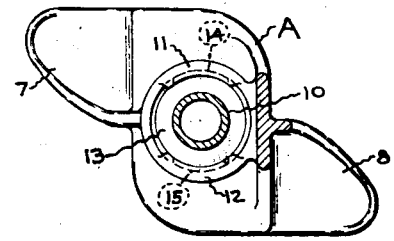
Figure 3 is a rear view of the structure shown in Figure 1, taken on the line 3—3 Figure 1.

Referring now to the drawings; my improvement comprises a coupling head A, having any suitable guiding means 7 and 8, and provided with a base 9 having an opening as shown. Upon its rear face the coupling head is provided with a pair of diametrically opposite dogs or portions 11 and 12 the width of which is slightly less than one fourth the circumference of said opening. A conduit or fitting 10 normally rests in the opening in the base 9 and may rotate therein to a limited extent. The conduit is provided with diametrically opposite dogs or projections 14 and 15 of slightly less width than the dogs 11 and 12, and adapted, when the fitting 10 is assembled into the head, to rest behind the dogs 11 and 12 as shown in Figures 1 and 3. The inner surface of the opening is formed to the outline of the enlarged forward end 13 of the conduit 10 and such enlarged forward end is provided with a seat or surface 16, preferably curved, which is adapted to receive the rear portion or flange 17 of the gasket 18. The curved seat or surface 16 preferably constitutes one half of the seat in which the rear flange of the gasket 18 rests, the other half thereof being formed by a shoulder in the forward wall of the opening of the coupling head A, as shown at 19. The fitting 10 is provided with a suitable shank upon which the ordinary train pipe hose 20 is mounted and suitably secured as by a clamp 21. It will be observed that the fitting 10 is provided at the bottom of its gasket seat with a forwardly extending cylindrically formed projection 22 which assists in maintaining the gasket properly seated in its seat 16 on the fitting.

Figures 4, 5:
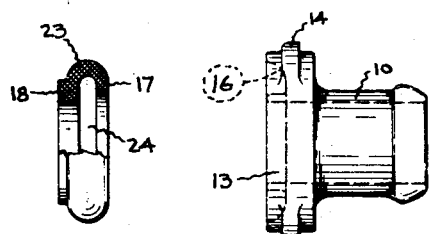
Figure 4 is a sectional elevation of the gasket used with my improvement.
Figure 5 is a side elevation of the fitting or conduit for attaching the hose to the coupling head.
Figure 6:
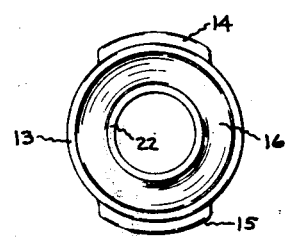
Figure 6 is a front elevation of the fitting shown in Figure 5.

While my improvement may be used with any style of gasket I preferably employ a gasket having a rear flange 17 and a front flange 17$^a$ and an intermediate portion 23, Figure 4, said gasket also being provided with an interior annular groove 24 which admits the fluid to the gasket. By this arrangement the fluid pressure carried expands the gasket into tight engagement both with its seat 19 in the coupling head A, and its seat 16 on the face of the conduit 10. This insures that the cooperating dogs on the head and conduit will be held in tight engagement and also insures that the gasket will be expanded into tight engagement with a complementary gasket in a mating coupling head. To further insure that the conduit 10 will not become accidentally disconnected from the coupling head A, I mount the conduit in the hose so that the normal position thereof will bring the lugs 14 and 15 behind the dogs 11 and 12, requiring that the hose be twisted to the right or left in order to insert or extract the conduit. This twisting action sets up torsional resistance in the hose which serves to maintain the conduit with its lugs properly positioned behind the dogs 11 and 12 as aforesaid, while the action of the fluid in expanding the gasket in its seat causes the latter to securely maintain the fitting 10 of mating heads in place.

When it is desired to remove a defective gasket from between the faces of a pair of coupled heads having my improvement, it is but necessary to rotate the conduit 10 one quarter revolution to the right or left whereupon it may be readily removed from the coupling head. The gasket may then be inspected and replaced, or a new gasket substituted therefor, and the parts re-assembled to the position shown in Figure 1. It is of course understood that the shank of the conduit 10, or the conduit itself, may lead in any desired direction from the rear face of the coupling head A. For convenience, I show it as leading from the head on the substantially longitudinal axis of the latter, but it may be otherwise located, and may otherwise lead from the head, if desired. Any suitable form of universal support for yieldingly suspending my improved coupling head from the car coupler B may be used. I have illustrated, in Figure 1, a suitable form of such support, but of course any of the several types common in the art may be substituted therefor.

What I claim is:

1. An automatic train pipe coupling head comprising a perforated base having suitable guiding means, a seat for a gasket formed on said head within said perforation, a conduit rotatably mounted in said perforation and removable therefrom by rotation of the conduit a partial revolution relative to the head, said conduit also having a seat on its front face, means for locking the conduit in the perforation, and a gasket interposed between the seat formed on said head and the seat on the front face of said conduit, said gasket being of flexible material and having an interior annular groove for admitting the fluid thereto whereby said gasket is expanded into tight engagement with said seats by the pressure of the fluid carried.

2. An automatic train pipe coupling head comprising a perforated base having suitable guiding means, a gasket seat formed on the forward wall of said perforation, a train pipe hose, means comprising a conduit mounted in said perforation for connecting said hose to said coupling head, said conduit being provided with an enlarged forward portion having on its front face a seat and being provided also with lugs adapted to fit behind complementary portions on said coupling head, and an expanding gasket interposed between the seat on the forward wall of said perforation and the seat on the front face of said conduit, substantially as and for the purpose described.

3. An automatic train pipe coupling head comprising a perforated base having suitable guiding means, a seat for a gasket formed in a wall of the perforation, a conduit extending into the perforation from the rear of said head, said conduit having a seat formed on its forward face, a resilient expansible gasket interposed between the seat formed on said wall and the seat formed on the forward face of said conduit, cooperating parts on said conduit and head for detachably securing the conduit in the head, said parts being held against displacement by the pressure of said gasket against said conduit when pressure fluid passes through the conduit.

4. An automatic train pipe coupling head comprising a flat vertically extending transverse base having suitable guiding means connected therewith and having also a perforation extending through the base at substantially a right angle to the plane of said face, a seat for a gasket formed on the forward wall of said perforation, a conduit extending into the perforation and provided with a projection fitting a recess formed adjacent the rear side of said head and having also a seat formed on its forward face, means to prevent said conduit tilting excessively in said perforation, and a gasket interposed between the said conduit and the seat formed on the forward wall of said perforation, said gasket having a face which normally projects slightly beyond the face of said coupling head and provided also with an interior annular groove to admit the fluid to the gasket whereby the gasket is expanded into tight engagement with said seats and with a mating gasket.

5. In an automatic train pipe connector a coupling head having a perforated base and suitable guiding means, a train pipe hose, a conduit connected thereto, cooperating means on said conduit and head whereby the conduit may be secured in or removed from said perforation of the head while connected to said hose, said means comprising spaced lugs on said conduit and complementary portions on said head, the former being engageable with or disengageable from the latter by rotation of said conduit relative to the head, a seat for a gasket formed partly on a wall of said perforation and partly on said conduit, and a gasket having a flange which flange is mounted in said seat and conforms substantially to the outline thereof, the flange being provided with an annular groove to admit the fluid thereto whereby the flange is expanded into tight engagement with said seat.

6. An automatic train pipe connector, comprising in combination, a coupling head having an opening therethrough, a conduit removably mounted in said opening and supporting a resilient gasket provided with an interior annular groove, means on said conduit and said coupling head for locking the conduit in the head, said means being moved into the locked position by a rotary movement, the locking effect between said parts being increased by said gasket on admission of a fluid to the conduit.

7. An automatic train pipe connector, comprising in combination, a coupling head having an opening therethrough, a conduit removably mounted in said opening and supporting a resilient gasket provided with an interior annular groove, said gasket being adapted to expand on the admission of a fluid thereto, and means to prevent rearward movement of the conduit in said opening when said gasket expands.

8. In an automatic train pipe connector, comprising in combination, a coupling head having an opening therethrough, a conduit mounted in said opening and removable rearwardly therefrom, means to lock said conduit in said opening, said conduit having a surface against which a resilient gasket is adapted to bear, a gasket arranged in said opening, said gasket being provided with a front flange projecting forwardly and adapted to contact with a similar flange on a gasket in a mating head and said gasket also having a rear flange adapted to contact with said surface on the conduit, said gasket also having an internal annular groove for receiving pressure fluid to expand the gasket tightly against said surface on the conduit and force the conduit rearwardly to increase the locking effect of said locking means.

9. In combination with a head for automatic train pipe connectors having an opening therethrough, a conduit mounted in said opening and removable rearwardly therefrom, means to hold said conduit in said opening, said conduit at its front end terminating short of the front end of said opening and having a surface thereon facing forwardly, an expansible gasket arranged in the front end of said opening, said gasket having a rear flange adapted to rest against said surface on the conduit and having a front flange for co-operating with a similar flange on a gasket in a mating head, said gasket having an internal annular groove between said flanges to receive compressed fluid flowing through said opening, whereby said gasket is expanded and pressure exerted to force said front flange forwardly and said rear flange rearwardly against said surface on the conduit.

10. In an automatic train pipe connector, a coupling head having an opening therethrough, there being a shoulder formed adjacent the front end of the opening, a conduit arranged in said opening and having its front end spaced rearwardly from said shoulder, means for removably locking the conduit in said opening, a gasket mounted in said opening in front of said conduit, said gasket having a portion resting against the end of the conduit and another portion resting against said shoulder and extending forwardly thereof, said gasket having an internal annular groove between said portions to receive compressed fluid flowing through said opening, whereby said gasket is expanded and pressure exerted to force said front flange forwardly and said rear flange rearwardly against the end of said conduit.

In testimony whereof I affix my signature.

GEORGE E. BALDWIN.